No. 676,040. Patented June 11, 1901.
R. JACKSON.
POWER TRANSMISSION GEAR.
(Application filed June 4, 1900.)
(No Model.) 3 Sheets—Sheet 1.

WITNESSES.
O. M. Thomson
J. J. Thomson Jr.

INVENTOR
Ralph Jackson
By James A. Coubrough
Attorney

No. 676,040. Patented June 11, 1901.
R. JACKSON.
POWER TRANSMISSION GEAR.
(Application filed June 4, 1900.)
(No Model.) 3 Sheets—Sheet 2.

WITNESSES
S. J. Thomson Jr
Conrad C. Locke.

INVENTOR
Ralph Jackson
By James A. Coubrough
Attorney.

No. 676,040. Patented June 11, 1901.
R. JACKSON.
POWER TRANSMISSION GEAR.
(Application filed June 4, 1900.)

(No Model.) 3 Sheets—Sheet 3.

WITNESSES
S. J. Thomson Jr
Conrad C. Locke

INVENTOR
Ralph Jackson
By James A. Coubrough
Attorney

UNITED STATES PATENT OFFICE.

RALPH JACKSON, OF ALTRINGHAM, ENGLAND.

POWER-TRANSMISSION GEAR.

SPECIFICATION forming part of Letters Patent No. 676,040, dated June 11, 1901.

Application filed June 4, 1900. Serial No. 19,030. (No model.)

*To all whom it may concern:*

Be it known that I, RALPH JACKSON, a subject of the Queen of Great Britain and Ireland, and a resident of Altringham, England, (whose post-office address is The Motor Cycle Works, Altringham,) have invented a certain new and useful Improvement in Power-Transmission Gear, (for which I have applied for patent in Great Britain, No. 22,508, dated November 11, 1899,) of which the following is a specification.

This invention relates to a differential speed-gear which is interposed between the motor-engine and the driving-wheel of a self-propelled carriage.

Figure 1:
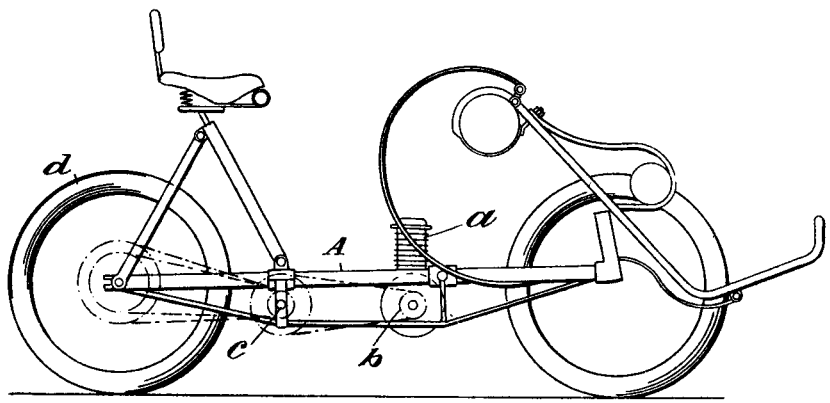
Figure 2:
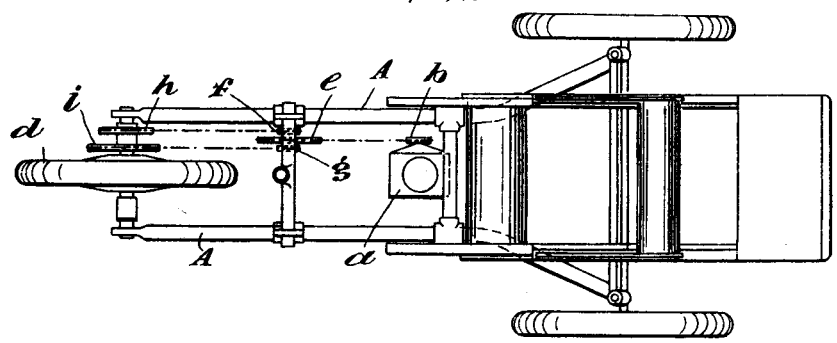
Figure 3:
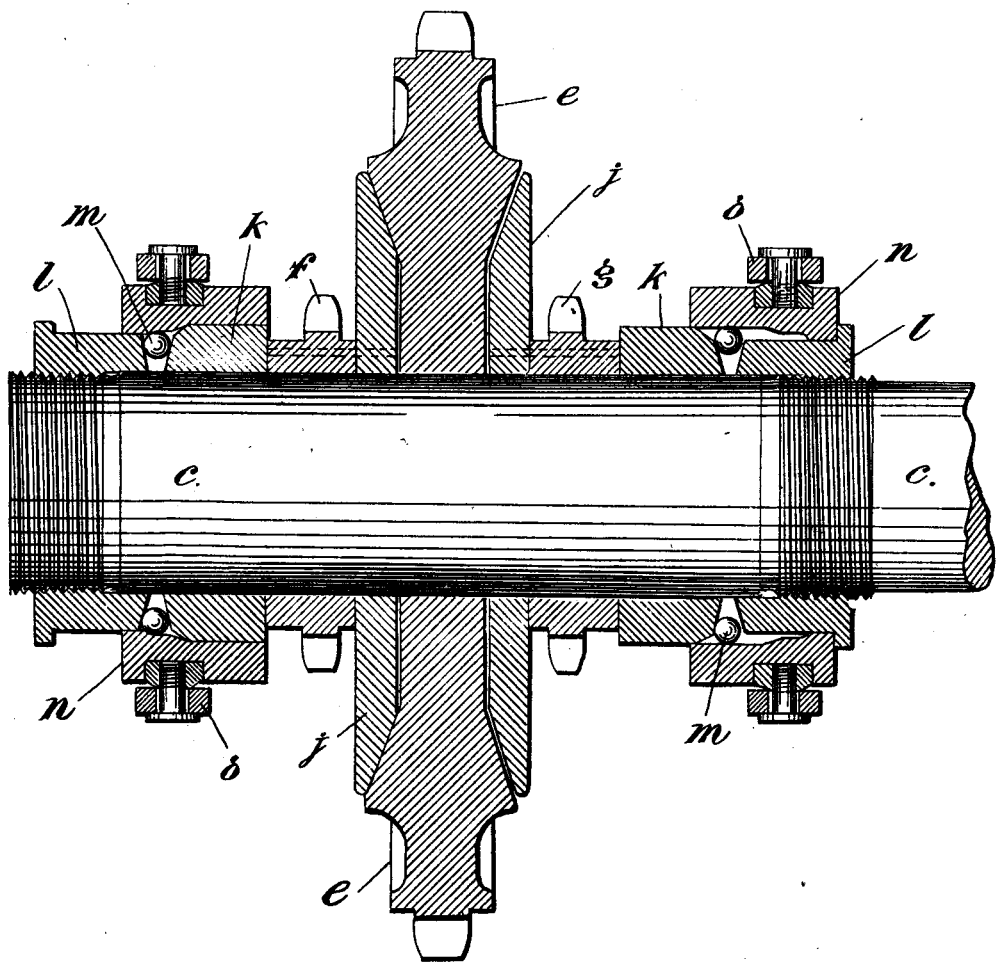
Figure 4:
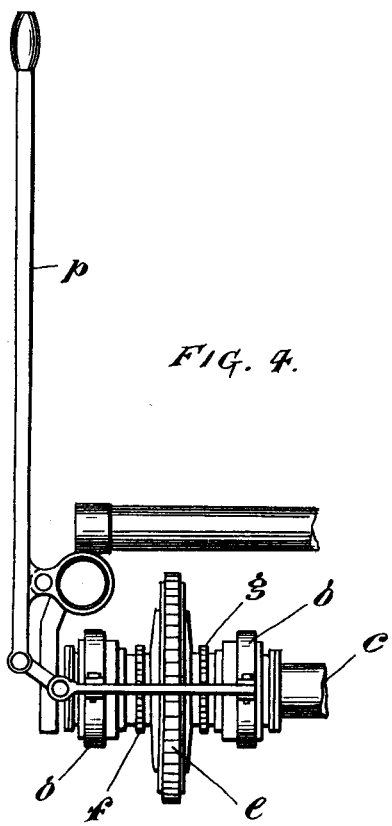
Figure 5:
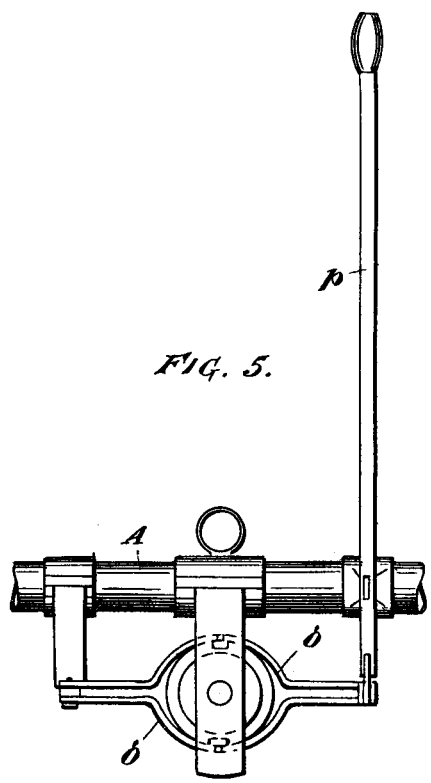

In the accompanying drawings, Figure 1 is a side elevation, and Fig. 2 is a plan, of a motor-tricycle. Fig. 3 is a side sectional view of the device according to this invention. Fig. 4 is a front view, and Fig. 5 an end view, illustrating the general arrangement of my invention.

Reference being had to Figs. 1 and 2, it will be seen that upon a tubular frame A is mounted the propelling-engine $a$. The crank-shaft of this engine carries a sprocket-wheel $b$, which transmits motion to the counter-shaft $c$.

$d$ is the driving-wheel of the tricycle. The sprocket-wheel $b$ is geared to a sprocket-wheel $e$, keyed on the shaft $c$. Two smaller sprocket-wheels $f$ $g$, freely mounted on the shaft $c$, transmit motion to the larger sprocket-wheels $h$ $i$, keyed on the hub of the driving-wheel $d$ when the wheel $f$ or the wheel $g$ is placed in frictional contact with the wheel $e$. Such frictional contact is effected by the device shown in Figs. 3, 4, and 5. Referring to these figures it will be seen that to the free sprocket-wheels $f$ $g$ are pinned friction-disks J, which fit in corresponding recesses in the sides of the wheel $e$. Freely mounted beside each of the wheels $f$ $g$ are collars $k$, formed with a coned outer surface, and adjustably screwed upon the shaft $c$ are other collars $l$, also provided with a coned surface, the coned surfaces of such fast and loose collars forming a V-race for a series of balls $m$. Covering such ball-races and arranged to slide upon such fast and loose collars are sleeves $n$, whose internal surfaces are partly cylindrical and partly conical. The sleeves $n$ are moved to and fro over the ball-races by the parallel levers $o$, operated by the hand-lever $p$. The effect of moving a sleeve $n$ over a ball-race is that its coned surface gradually forces the balls $m$ between the abutting coned surfaces of the collars $k$ $l$. The free collar $k$, the sprocket-wheel $f$, (or $g$,) and its friction-disk $j$ are thus pushed in an axial direction and the friction-disk is forced against the wheel $e$. Continued movement of the sleeve $n$ serves to lock the balls $m$, and the result is that the sprocket-wheel $f$ (or $g$) is placed in frictional contact with the wheel $e$. In Fig. 3 the wheel $f$ is shown locked to the wheel $e$, the wheel $g$ being free. The levers $o$ are coupled and act in unison, so that when in their central position, as in Fig. 5, both of the wheels $f$ $g$ are free, and when one sleeve $n$ is locking its sprocket-wheel the other sleeve $n$ is moving freely over its ball-race. A differential speed-gear is thus arranged which besides providing for different speeds permits of the shaft $c$ being thrown out of gear with the wheel $d$, so that the shaft $c$ may turn idly without a load upon it, and this leaves the motor-engine free to make a few preparatory revolutions, thereby developing some power before being applied to its work.

Having now described my invention, what I claim as new, and desire to secure by Letters Patent, is—

In combination with the fixed wheel $e$ and the free wheels $f$ and $g$ on the shaft $c$, the friction-disks $j$ attached to the wheels $f$, $g$, the collars $k$ free on the shaft and the collars $l$ adjustably fixed thereon, both having coned surfaces forming ball-races for balls $m$, and the sliding sleeves $n$ having their internal surfaces partly coned in order to force the balls $m$ between such fixed and free collars and displace the latter axially so that one or other of the wheels $f$, $g$, is placed in frictional gear with the wheel $e$ or both wheels may be put out of gear therewith, as described.

In witness whereof I have hereunto set my hand and affixed my seal in the presence of two witnesses.

RALPH JACKSON. [L. S.]

Witnesses:
T. L. WILKINSON,
J. A. CONBROUGH.